United States Patent
McIntosh et al.

(10) Patent No.: US 11,611,702 B1
(45) Date of Patent: Mar. 21, 2023

(54) SYSTEMS AND METHODS FOR STABILIZING VIDEOS USING OPTICAL FLOW DERIVED MOTION AND MOTION SOLVE DERIVED MOTION

(71) Applicant: GoPro, Inc., San Mateo, CA (US)

(72) Inventors: Robert McIntosh, Marina Del Ray, CA (US); Andrew Russell, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 280 days.

(21) Appl. No.: 17/028,407

(22) Filed: Sep. 22, 2020

(51) Int. Cl.
*H04N 5/232* (2006.01)
*G06T 7/215* (2017.01)

(52) U.S. Cl.
CPC .......... *H04N 5/23254* (2013.01); *G06T 7/215* (2017.01); *H04N 5/232933* (2018.08)

(58) Field of Classification Search
CPC .......... H04N 5/23254; H04N 5/232933; G06T 7/215
See application file for complete search history.

(56) References Cited

U.S. PATENT DOCUMENTS

2015/0256755 A1* 9/2015 Wu ..................... G06T 7/277
348/208.6

* cited by examiner

*Primary Examiner* — Twyler L Haskins
*Assistant Examiner* — Fayez A Bhuiyan
(74) *Attorney, Agent, or Firm* — Esplin & Associates, PC (57) ABSTRACT

An image capture device may capture a video while experiencing motion. Motion of the image capture device during video capture may be determined based on optical flow and structure from motion solve of the video. Optical flow derived motion and/or the motion solve derived motion of the image capture device may be selected to perform stabilization of the video.

20 Claims, 6 Drawing Sheets

Capture Duration

FIG. 6

SYSTEMS AND METHODS FOR STABILIZING VIDEOS USING OPTICAL FLOW DERIVED MOTION AND MOTION SOLVE DERIVED MOTION

FIELD

This disclosure relates to selecting among optical flow derived motion and motion solve derived motion of an image capture device for stabilizing a video captured by the image capture device.

BACKGROUND

A video may have been captured by an image capture device in motion. The motion of the image capture device during the capture of the video may cause the video to appear jerky/shaky. Inaccurate determination of the image capture device motion may result in inaccurate stabilization of the video.

SUMMARY

This disclosure relates to stabilizing videos. Visual information and/or other information may be obtained. The visual information may define visual content captured by an image capture device during a capture duration. The visual content may be defined within video frames. Optical flow derived motion of the image capture device during the capture duration may be determined based on optical flow within the video frames and/or other information. Motion solve derived motion of the image capture device during the capture duration may be determined based on a structure from motion solve of the video frames and/or other information. Selection may be made among the optical flow derived motion of the image capture device and the motion solve derived motion of the image capture device for stabilization of the visual content. The visual content may be stabilized based on the selected motion of the image capture device and/or other information.

A system that stabilizes videos may include one or more electronic storages, one or more processors, and/or other components. An electronic storage may store visual information, information relating to visual content, information relating to image capture device, information relating to capture duration, information relating to video frames, information relating to optical flow, information relating to optical flow derived motion, information relating to motion solve, information relating to structure from motion solve, information relating to motion solve derived motion, information relating to selection among optical flow derived motion and motion-solved-derived motion information relating to selected motion, information relating to stabilization of visual content, and/or other information.

The processor(s) may be configured by machine-readable instructions. Executing the machine-readable instructions may cause the processor(s) to facilitate stabilizing videos. The machine-readable instructions may include one or more computer program components. The computer program components may include one or more of a visual information component, an optical flow component, a motion solve component, a selection component, a stabilization component, and/or other computer program components.

The visual information component may be configured to obtain visual information and/or other information. The visual information may define visual content. The visual content may have been captured by an image capture device during a capture duration. The visual content may be defined within video frames.

The optical flow component may be configured to determine optical flow derived motion of the image capture device during the capture duration. The optical flow derived motion of the image capture device during the capture duration may be determined based on optical flow within the video frames and/or other information.

The motion solve component may be configured to determine motion solve derived motion of the image capture device during the capture duration. The motion solve derived motion of the image capture device during the capture duration may be determined based on a structure from motion solve of the video frames and/or other information.

A selection component may be configured to select among the optical flow derived motion of the image capture device and the motion solve derived motion of the image capture device. The selection may be made among the optical flow derived motion of the image capture device and the motion solve derived motion of the image capture device for stabilization of the visual content.

In some implementations, selecting among the optical flow derived motion of the image capture device and the motion solve derived motion of the image capture device may include switching between the optical flow derived motion of the image capture device and the motion solve derived motion of the image capture device. In some implementations, switching between the optical flow derived motion of the image capture device and the motion solve derived motion of the image capture device may include: initially selecting the motion solve derived motion of the image capture device for the stabilization of the visual content; and switching from the motion solve derived motion of the image capture device to the optical flow derived motion of the image capture device for the stabilization of the visual content responsive to failure of the motion solve of the video frames.

In some implementations, selecting among the optical flow derived motion of the image capture device and the motion solve derived motion of the image capture device may include options of: selecting the optical flow derived motion of the image capture device for the stabilization of the visual content; selecting the motion solve derived motion of the image capture device for the stabilization of the visual content; and selecting both the optical flow derived motion of the image capture device and the motion solve derived motion of the image capture device for the stabilization of the visual content. In some implementations, the optical flow derived motion of the image capture device and the motion solve derived motion of the image capture device may be weighed differently for the stabilization of the visual content.

In some implementations, selecting among the optical flow derived motion of the image capture device and the motion solve derived motion of the image capture device may be performed based on detection of a scene depicted within the visual content, detection of one or more things depicted within the visual content, detection of optical illusion depicted within the visual content, and/or other information.

In some implementations, different motion of the image capture device for the stabilization of the visual content may be selected for different segments of the capture duration such that for a first segment of the capture duration, the optical flow derived motion of the image capture device is selected for the stabilization of the visual content, and for a second segment of the capture duration, the optical flow derived motion of the image capture device is selected for the stabilization of the visual content.

In some implementations, one or more spatial extents of the visual content may be masked to selectively use the selected motion of the image capture device to stabilize the visual content. The spatial extent(s) of the visual content may be masked based on distances of one or more things depicted within the visual content from the image capture device during the capture duration and/or other information. The spatial extent(s) of the visual content may be masked based on detection of one or more things depicted within the visual content and/or other information.

The stabilization component may be configured to stabilize the visual content. The visual content may be stabilized based on the selected motion of the image capture device and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
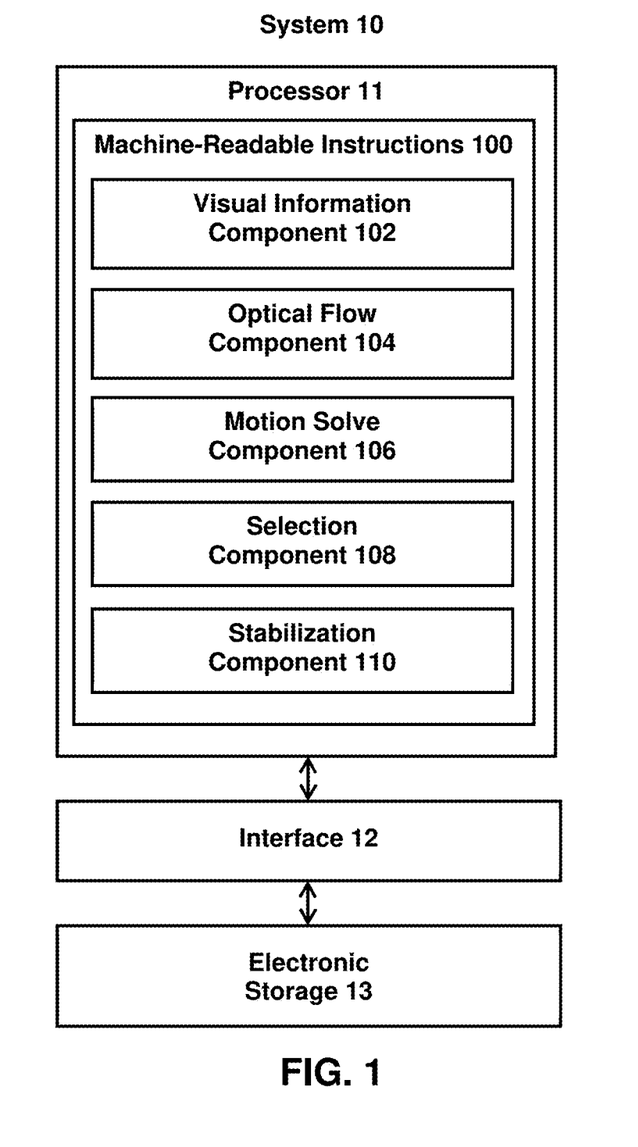
FIG. 1 illustrates an example system that stabilizes videos.

FIG. 1 illustrates a system 10 for stabilizing videos. The system 10 may include one or more of a processor 11, an interface 12 (e.g., bus, wireless interface), an electronic storage 13, and/or other components. Visual information and/or other information may be obtained by the processor 11. The visual information may define visual content captured by an image capture device during a capture duration. The visual content may be defined within video frames. Optical flow derived motion of the image capture device during the capture duration may be determined by the processor 11 based on optical flow within the video frames and/or other information. Motion solve derived motion of the image capture device during the capture duration may be determined by the processor 11 based on a structure from motion solve of the video frames and/or other information. Selection may be made among the optical flow derived motion of the image capture device and the motion solve derived motion of the image capture device by the processor 11 for stabilization of the visual content. The visual content may be stabilized by the processor 11 based on the selected motion of the image capture device and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to image capture device, information relating to capture duration, information relating to video frames, information relating to optical flow, information relating to optical flow derived motion, information relating to motion solve, information relating to structure from motion solve, information relating to motion solve derived motion, information relating to selection among optical flow derived motion and motion-solved-derived motion information relating to selected motion, information relating to stabilization of visual content, and/or other information.

A video may include video content captured by an image capture device during a capture duration. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Video content may have a progress length. Progress length may be measured/defined in terms of time durations and/or frame numbers. The progress length of the video content may correspond to the capture duration. The progress length of the video content may be determined based on the capture duration. The progress length of the video content may be same as the capture duration, shorter than the capture duration (e.g., playback rate of the video content is faster than the capture rate of the video content), and/or longer than the capture duration (e.g., playback rate of the video content is slower than the capture rate of the video content).

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length (duration, number of frames) of the video. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device. A field of view of visual content may define a field of view of a scene captured within the visual content. A field of view of visual content may refer to an extent of a scene captured and/or viewable within the visual content. A field of view of visual content may refer to a part of a scene from which light is received for generation of the visual content. For example, the video may include a wide field of view video, such as a panoramic video or a spherical video, and the field of view may of the spherical video may include a wide field of view (e.g., greater than 120 degrees, 360 degrees). Other fields of view are contemplated Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

The sound(s) within the audio content may correspond to the sound(s) that were captured when capturing the visual content. For example, the visual content may include a visual capture of an activity involving one or more persons and the audio content may include sound capture of the activity, which may include sounds produced by persons or non-persons (e.g., animals, machines, objects). One or more portions of the audio content may include capture of voice of one or more persons and/or other sounds. Voice may refer to vocal sounds made by a person. Voice may be directed to one or more persons or one or more non-persons. Voice may include part of a spoken word/sound, one or more spoken words/sounds, and/or other vocal sounds. For example, voice may include speech, singing, shouting, cheering, yelling, screaming, booing, and/or other voice.

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device.

An image capture device may refer to a device captures visual content and/or other content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). An image capture device may include one or more optical elements, one or more image sensors, one or more processors, and/or other components. An optical element may guide light within a field of view to an image sensor. The image sensor may generate a visual output signal conveying visual information defining visual content based on light that becomes incident thereon.

Figure 3:
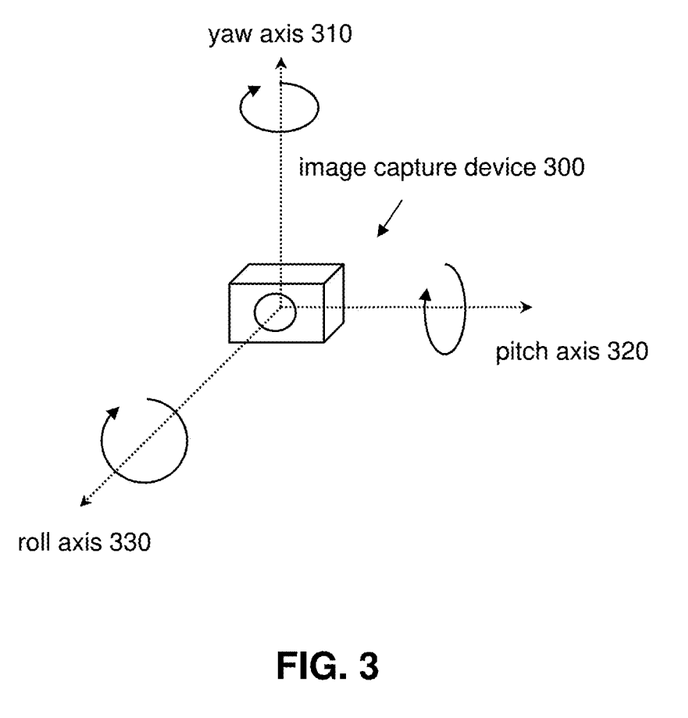
FIG. 3 illustrates example direction of motion of an image capture device.

An image capture device may experience motion during capture of a video. That is, the image capture device may move during a capture duration. Motion of the image capture device may include translational motion, rotational motion, and/or other motion. FIG. 3 illustrates example direction of motion of an image capture device 300.

Translational motion of the image capture device may refer to movement of the image capture device along one or more translational directions (e.g., moving forward, backward, laterally, vertically). For instance, referring to FIG. 3, translational motion of the image capture device 300 may include movement of the image capture device along one or more of a yaw axis 310, a pitch axis 320, and/or a roll axis 330. Translational motion of the image capture device may include movement of the image capture device that changes the location (GPS location) of the image capture device and/or elevation of the image capture device.

Rotational motion of the image capture device may refer to movement of the image capture device around one or more axis or one or more points, such as a center point. For instance, referring to FIG. 3, rotational motion of the image capture device 300 may include rotation of the image capture device 300 about one or more of the yaw axis 310, the pitch axis 320, and/or the roll axis 330. Rotational motion of the image capture device may include rotation of the image capture device that changes orientation of the image capture device with respect to a fixed reference (e.g., round). Other motion of the image capture device are contemplated.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of a visual information component 102, an optical flow component 104, a motion solve component 106, a selection component 108, a stabilization component 110, and/or other computer program components.

The visual information component 102 may be configured to obtain visual information and/or other information. Obtaining visual information may include one or more of accessing, acquiring, analyzing, determining, examining, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor) and/or one or more software components (e.g., software running on a computing device).

The visual information component 102 may be configured to obtain visual information defining visual content during acquisition of the visual content and/or after acquisition of the visual content by one or more image sensors/image capture devices. For example, the visual information component 102 may obtain visual information defining visual content while the visual content is being captured by one or more image sensors/image capture devices. The visual information component 102 may obtain visual information defining visual content after the visual content has been captured and stored in memory (e.g., the electronic storage 13).

In some implementations, the visual information component 102 may obtain visual information based on user interaction with a user interface/application (e.g., video editing application, video player application), and/or other information. For example, a user interface/application may provide option(s) for a user to select visual content to be stabilized. The visual information defining the visual content may be obtained based on the user's selection of the visual content through the user interface/application. Other selections of visual content for retrieval of visual information are contemplated.

The visual information may define visual content. The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of video frames of the video. Other types of visual information are contemplated.

The visual content may have been captured by an image capture device during a capture duration. The visual content may be defined within video frames of a video. The video may include multiple video frames, with different video frames corresponding to different points/moments within the progress length of the video. The video frames may include different video frames captured at different moments (points in time, durations of time) within the capture duration. For example, the video frames may include a video frame captured at a particular moment within the capture duration, and/or other video frames captured at other moments within the capture duration.

The image capture device may have experienced motion (e.g., translational motion and/or rotational motion) during capture of the visual content. For the image capture device may have been carried by a person, an animal, or a vehicle during capture of the visual content. The image capture device may have been unintentionally moved during capture of the visual content. For example, the image capture device may have been rotated due to vibration and/or unsteady carrying of the image capture device. Such motion of the image capture device may cause playback of the video to appear jerky or shaky. Information regarding the motion experienced by the image capture device may be used to stabilize the visual content.

The optical flow component 104 may be configured to determine optical flow derived motion of the image capture device during the capture duration. Optical flow derived motion of the image capture device may refer to motion of the image capture device derived from optical flow within the video frames captured by the image capture device. The optical flow derived motion of the image capture device may include rotational motion of the image capture device derived from optical flow within the video frames and/or translational motion of the image capture device derived from optical flow within the video frames.

The optical flow derived motion of the image capture device during the capture duration may be determined based on optical flow within the video frames and/or other information. Optical flow within the video frames may refer to pattern of apparent motion of things depicted within the video frames. Optical flow within the video frames may be the result of the motion of the image capture device with respect to stationary things within the field of view of the image capture device. Optical flow within the video frames may be the result of the motion of the things with respect to the image capture device. For example, optical flow within the video frames may include apparent motion of individual pixels on the image plane (e.g., motion between video frames of a pixel depicting a particular thing). The optical flow component 104 may be configured to analyze the visual content of the video frames to determine the optical flow within the video frames, and the optical flow within the video frames may be used to determine how the image capture device moved while capturing the video frames.

For instance, the visual content within the video frames may include depiction of a stationary thing, such as a building. Optical flow within the video frames may provide indication of how the building is moving within the video frames. The movement of pixels depicting the building within the video frames may be caused by the image capture device moving while capturing the building within the video frames. For instance, while capturing the building within the video frames, the image capture device may have rotated in a clockwise direction. The clockwise rotation of the image capture device may cause optical flow in a counter-clockwise direction within the video frames. The direction of the optical flow within the video frames may be reversed to determine the direction of the rotational motion of the image capture device while capturing the video frames. The velocity of the optical flow may indicate the speed with which the image capture device moved while capturing the video frames. The velocity of the optical flow may be used to determine the speed of the rotational motion of the image capture device. Other determination of optical flow derived motion of the image capture device are contemplated.

The motion solve component 106 may be configured to determine motion solve derived motion of the image capture device during the capture duration. Motion solve derived motion of the image capture device may refer to motion of the image capture device derived from a structure from motion solve of the video frames captured by the image capture device. The motion solve derived motion of the image capture device may include rotational motion of the image capture device derived from a structure from motion solve of the video frames and/or translational motion of the image capture device derived from a structure from motion solve of the video frames.

The motion solve derived motion of the image capture device during the capture duration may be determined based on a structure from motion solve of the video frames and/or other information. A structure from motion solve of the video frames may refer to determination (e.g., estimation, reconstruction) of one or more three-dimensional structures from a sequence of two-dimensional images (video frames). A structure from motion solve may utilize parallax motion of tracking points within the video frames to determine position and/or distance of the tracking points from the image capture device to the tracking points. Changes in position and/or distance of the tracking points from the image capture device may be the result of the motion of the image capture device with respect to stationary things within the field of view of the image capture device. Changes in position and/or distance of the tracking points from the image capture device may be the result of the motion of the things with respect to the image capture device. For example, tracking points within the video frames may move from frame to frame based on movement of the image capture device with respect to the things represented by the tracking points. The optical flow component 104 may be configured to analyze the visual content of the video frames for the structure from motion solve of the video frames, and the changes in the tracking points across different video frames may be used to determine how the image capture device moved while capturing the video frames.

For instance, referring back to the example of video frames may including depiction of a building, tracking points on the building may provide indication of how the building is moving within the video frames. The movement of tracking points on the building within the video frames may be caused by the image capture device moving while capturing the building within the video frames. The direction of the motion of the image capture device may be determined from the direction in which the tracking points move across the video frames and the speed of the motion of the image capture device may be determined from the speed in which the tracking points move across the video frames. Other determination of motion solve derived motion of the image capture device are contemplated.

A selection component 108 may be configured to select among the optical flow derived motion of the image capture device and the motion solve derived motion of the image capture device. The selection may be made among the optical flow derived motion of the image capture device and the motion solve derived motion of the image capture device for stabilization of the visual content. The selection of the motion may include selection of one or both of the optical flow derived motion of the image capture device and the motion solve derived motion of the image capture device. That is, one or both of the motion of the image capture device may be selected for use in performing stabilization of the visual content.

The accuracy of the optical flow derived motion of the image capture device and the motion solve derived motion of the image capture device (how accurately the derived motion matches the motion experienced by the image capture device) may depend on the type of things depicted within the video frames. Use of a single technique (e.g., motion solve, optical flow) to determine the motion of the image capture device during the capture duration may result in inaccurate determination of the motion due to ineffectiveness of the technique for the type of content captured within the video frames. For instance, visual content that does not include depiction of consistent structure, such as video of sky or water, may result in accurate structure from motion solve and/or failure of motion solve.

Rather than relying on a single technique to determine the motion of the image capture device during the capture duration, the selection component 108 may switch between use of optical flow and motion solve, and/or may use a mix of optical flow and motion solve to determine the motion of the image capture device. The selection component 108 may select the technique(s) that are more effective for the visual content/video frames being analyzed. For example, optical flow may be more effective for visual content including depiction of faraway things (e.g., providing depiction of rotational motion) while motion solve may be more effective for visual content that includes a lot of parallax (e.g., captured from a drone flying fast and low to the ground).

In some implementations, selecting among the optical flow derived motion of the image capture device and the motion solve derived motion of the image capture device may include switching between the optical flow derived motion of the image capture device and the motion solve derived motion of the image capture device. That is, the selection component 108 may be configured to select one of the optical flow derived motion of the image capture device and the motion solve derived motion of the image capture device for use in performing stabilization of some video frames, and then switch to the other for use in performing stabilization of other video frames.

In some implementations, switching between the optical flow derived motion of the image capture device and the motion solve derived motion of the image capture device may include: initially selecting the motion solve derived motion of the image capture device for the stabilization of the visual content; and switching from the motion solve derived motion of the image capture device to the optical flow derived motion of the image capture device for the stabilization of the visual content responsive to failure of the motion solve of the video frames. The selection component 108 may utilize the motion solve derived motion of the image capture device as the default selection in performing stabilization, and switch to the motion solve derived motion of the image capture device for video frames in which the motion solve of the video frames failed.

Figure 4:
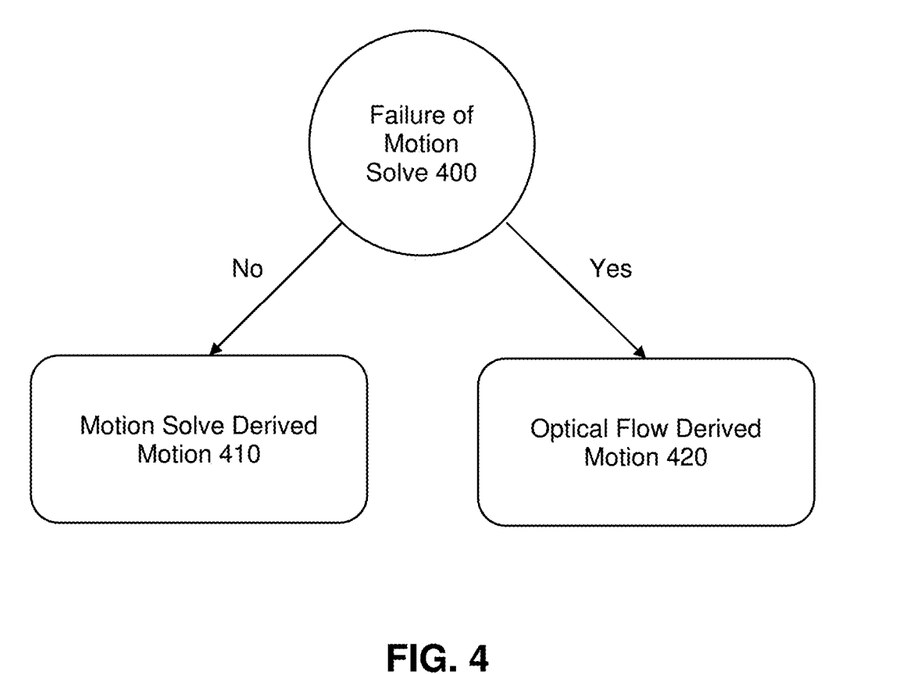
FIG. 4 illustrates example selection of image capture device motion.

FIG. 4 illustrates example selection of image capture device motion. As shown in FIG. 4, the process of selecting the image capture device motion may start with check on whether there was failure of motion solve 400. If the motion solve did not fail, then stabilization may be performed using motion solve derived motion 410 of the image capture device. If the motion solve failed, then stabilization may be performed using optical flow derived motion 420 of the image capture device. In some implementations, whether the motion solve failed or not may be determined based on error minimization for the motion solve. If the error value for the motion solve does not reach a threshold value, then the motion solve may be considered to have failed, and the selection component 108 may select the optical flow derived motion of the image capture device for stabilization of the visual content.

In some implementation, the selection component 108 may switch between the optical flow derived motion of the image capture device and the motion solve derived motion of the image capture device based on stabilization performance using the selected motion. The visual content may be analyzed after stabilization to determine the extent to which the visual content still contains shaky footage. Based on the visual content containing more shakiness than a threshold level, the selection component 108 may switch to the other motion to perform the stabilization. For example, the stabilization of the visual content may initially be performed using the motion solve derived motion of the image capture device, and based on the visual content still including more than the desired amount of shakiness after the stabilization, the stabilization of the visual content may be reperformed using the optical flow derived motion of the image capture device, or vice versa. The stabilization may be reperformed for portions of the visual content (e.g., subset of video frames) in which the initially selected motion did not lead to adequate stabilization or for the entirety of the visual content (e.g., all video frames).

Figure 5:
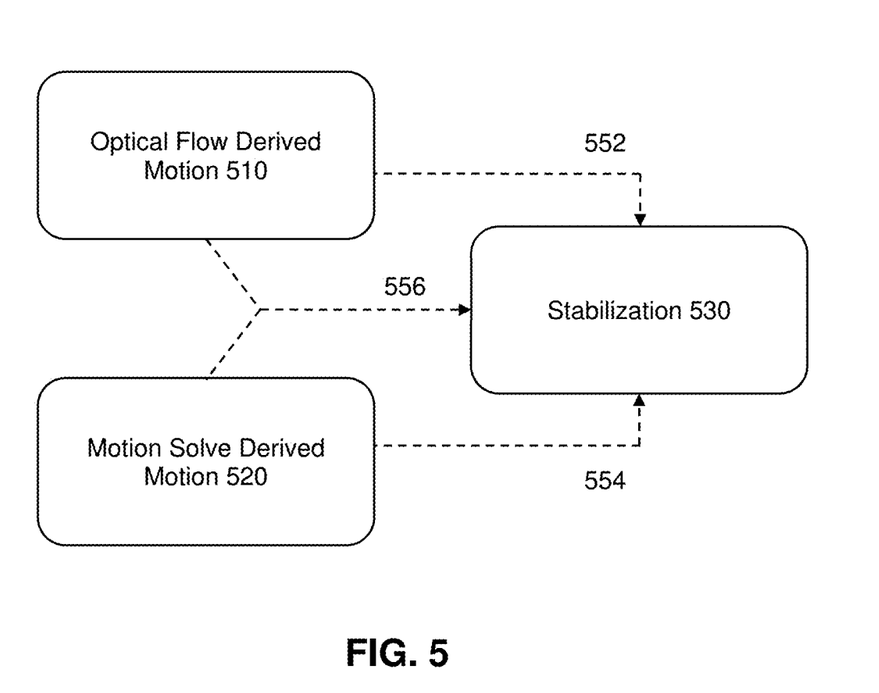
FIG. 5 illustrates example selection of image capture device motion for video stabilization.

In some implementations, selecting among the optical flow derived motion of the image capture device and the motion solve derived motion of the image capture device may include options of selecting one of the motion, or selecting both of the motion. FIG. 5 illustrates example selection of image capture device motion for video stabilization. Selection may be made among optical flow derived motion 510 and motion solve derived motion 520 to perform stabilization 530. The options include (1) option 552: selecting the optical flow derived motion 510 of the image capture device for the stabilization 530 of the visual content; (2) option 554: selecting the motion solve derived motion 520 of the image capture device for the stabilization 530 of the visual content; and (3) option 556: selecting both the optical flow derived motion 510 of the image capture device and the motion solve derived motion 520 of the image capture device for the stabilization 530 of the visual content.

In some implementations, the optical flow derived motion of the image capture device and the motion solve derived motion of the image capture device may be weighed differently for the stabilization of the visual content. That is, when both motion are selected for use in performing stabilization, the two motion may be combined with one of the motion contributing more to the final motion than the other motion. In some implementations, the weights given to different motion may depend on distance between the image capture device and the thing(s) depicted within the visual content. For example, for video frames including depiction of nearby things, the motion solve derived motion of the image capture device may be weighed more than the optical flow derived motion of the image capture in calculating the motion of the image capture device to perform video stabilization. For video frames including depiction of faraway things, the optical flow derived motion of the image capture device may be weighed more than the motion solve derived motion of the image capture in calculating the motion of the image capture device to perform video stabilization. The distance at which the selected motion is switched may be set by the system 10 (e.g., default value set) and/or by the user (e.g., value changed by user).

In some implementations, selecting among the optical flow derived motion of the image capture device and the motion solve derived motion of the image capture device may be performed based on detection of a scene depicted within the visual content, detection of one or more things depicted within the visual content, detection of optical illusion depicted within the visual content, and/or other information. The selection component 108 may take into account one or more of the scene detection, thing detection, and/or optical illusion detection to determine which of the motion will be selected for stabilization of the visual content.

Detection of a scene depicted within the visual content may refer to classification, identification, recognition, and/or other detection of the type of scene depicted within the visual content. For example, detection of a scene depicted within the visual content may include determination of the type of scene (e.g., watery scene, sky scene, beach scene, city scene, mountain scene, dessert scene) depicted within the visual content, with different types of scene associated with different motion and/or different combination of motion (e.g., use of different weights in combining motion). For instance, optical flow may provide better estimation of image capture device motion for video frames including depiction of non-rigid scenes, such as a watery scene.

Detection of a thing depicted within the visual content may refer to classification, identification, recognition, and/or other detection of the type of thing depicted within the visual content. For example, detection of a thing depicted within the visual content may include determination of the type of thing (e.g., building, person, animal, vehicle, landscape) depicted within the visual content, with different types of thing associated with different motion and/or different combination of motion. For instance, optical flow may provide better estimation of image capture device motion for video frames including depiction of non-rigid things, such as smoke and/or crowds of people.

Detection of optical illusion depicted within the visual content with the visual content may refer to classification, identification, recognition, and/or other detection of the type of optical illusion depicted within the visual content. For example, detection of optical illusion depicted within the visual content may include determination of the type of optical illusion (e.g., barber poll effect that creates illusion of vertical movement; inside-out effect that creates illusion of recessed corner for protruding corner, or vice versa) depicted within the visual content, with different types of optical illusion associated with different motion and/or different combination of motion. For instance, motion solve for video frames including depiction of optical illusion may not fail, but optical flow may provide better estimation of image capture device motion for such video frames. When such optical illusion is detected, the optical flow derived motion of the image capture device may be used instead of the motion solve derived motion of the image capture device, or the optical flow derived motion of the image capture device may be weighed more than the motion solve derived motion of the image capture device.

Figure 6:
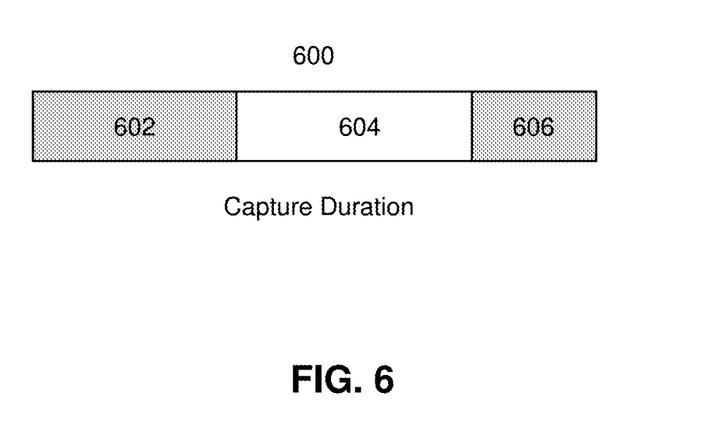
FIG. 6 illustrates example segments of capture duration.

In some implementations, different motion of the image capture device for the stabilization of the visual content may be selected for different segments of the capture duration such that for one or more segments of the capture duration, the optical flow derived motion of the image capture device is selected for the stabilization of the visual content, and for one or more other segments of the capture duration, the optical flow derived motion of the image capture device is selected for the stabilization of the visual content. For example, the capture duration may be separated into segment(s) in which the motion of the image capture device is determined using motion solve and segment(s) in which the motion of the image capture device is determined using optical flow. FIG. 6 illustrates example segments 602, 604, 606 of a capture duration 600. In FIG. 6, the optical flow derived motion of the image capture device may be selected for the segments 602, 606 and the motion solve derived motion of the image capture device may be selected for the segment 604, or vice versa. Such segmentation of the capture duration may enable different motion/combination of motion to be used to determine the motion of the image capture device for stabilization of the visual content.

In some implementations, one or more spatial extents of the visual content may be masked to selectively use the selected motion of the image capture device to stabilize the visual content. A spatial extent of the visual content may refer to a spatial portion of the visual content (e.g., grouping of pixels). The spatial extent(s) of the visual content may be masked for so that only the masked or the unmasked spatial extent(s) of the visual content is used in determining the motion of the image capture device. For example, a spatial extent of video frames may be masked so that the spatial extent is not taken into account when computing optical flow within the video frames. As another example, a spatial extent of video frames may be masked so that the spatial extent is not taken into account when performing structure for motion solve using the video frames. Masking of the visual content may enable the motion of the image capture device to be more accurately determined by excluding portions of the video frames that may confuse/interfere with the selected method of motion determination.

In some implementations, the spatial extent(s) of the visual content may be masked based on distances of one or more things depicted within the visual content from the image capture device during the capture duration and/or other information. That is, the distance between the image capture device and the thing(s) depicted within the video frames may determine which spatial extent(s) of the video frames are masked. For example, when determining optical flow derived motion of the image capture device, spatial extent(s) of the video frames that include depiction of things that are closer than a threshold distance may be masked so that spatial extent(s) of the video frames that include depiction of things that are further than the threshold distance are analyzed for optical flow calculation (e.g., masking foreground objects and using background objects for optical flow calculation). When determining motion solve derived motion of the image capture device, spatial extent(s) of the video frames that include depiction of things that are further than a threshold distance may be masked so that spatial extent(s) of the video frames that include depiction of things that are closer than the threshold distance are analyzed in structure for motion solve (e.g., masking background objects and using foreground objects for motion solve). In some implementations, the distance between thing(s) depicted within the visual content and the image capture device during the capture duration may be determined using one or more depth maps. In some implementations, depth map(s) may be generated from the video frames using machine learning technique based on monocular computer vision.

In some implementations, the spatial extent(s) of the visual content may be masked based on detection of one or more things depicted within the visual content and/or other information. That is, detection of thing(s) depicted within the video frames may determine which spatial extent(s) of the video frames are masked. For example, when determining motion of the image capture device, spatial extent(s) of the video frames that include depiction of things that are likely to move between video frames may be masked so that the such spatial extent(s) are not included in calculation of optical flow and/or structure for motion solve. For instance, if an object depicted in the video frames is identified as a moving/non-rigid object (e.g., moving vehicle/person/animal, water), then the extent of the video frames depicting the object may be masked so that it is excluded from optical flow calculation and/or motion solve. Pixels of the video frame depicting things that are not consistent between frames may be excluded from analysis.

The stabilization component 110 may be configured to stabilize the visual content. The visual content may be stabilized based on the selected motion of the image capture device and/or other information. The selected motion of the image capture device may include the optical flow derived motion of the image capture device, the motion solve derived motion of the image capture device, both the optical flow derived motion of the image capture device and the motion solve derived motion of the image capture device, and/or other motion of the image capture device. Stabilization of the visual content may be performed using technique(s) that are more effective at determine motion of the image capture device. For example, for visual content in which optical flow derived motion is more accurate than the motion solve derived motion, stabilization of the visual content may be performed using the optical flow derived motion. For visual content in which motion solved derived motion is more accurate than the optical flow derived motion, stabilization of the visual content may be performed using the motion solve derived motion. The stabilization component 110 may dynamically switch between use of differently derived motion of the image capture device based on accuracy of the differently derived motion.

Visual content may be stabilized provide a smoother view of the visual content. The visual content may be stabilized to account for the motion of the image capture device during the capture duration. The effect of the motion of the image capture device within the visual content (e.g., movement of depictions in the video frames due to motion of the image capture device) may be offset based on the selected motion of the image capture device. Stabilized visual content may be generated as encoded visual content and/or as instructions for rendering the stabilized visual content. For instance, the stabilized visual content may be generated as an encoded version/copy of the stabilized visual content (e.g., encoded video file) and/or a director track that defines how the visual content is to be used/presented during playback.

In some implementations, the visual content may be stabilized using a punchout of the visual content. Use of the punchout may effectuate stabilization of the visual content via selective cropping. Stabilization of visual content using a punchout of the visual content may include using smaller spatial extents of the visual content to provide a punchout view of the visual content that creates a more stable view than when viewing the entirety of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial extents of the visual content.

The placement of the punchout within the visual content (e.g., location/orientation of the punchout within the video frames) may be determined based on the motion of the image capture device during the capture duration (as indicated by the selected motion) and/or other information. For example, rotation of the punchout within the visual content may compensate for rotation of the image capture device during the capture duration. In some implementations, the position (e.g., translational position, rotational position) of the image capture device during the capture duration may be determined based on the motion of the image capture device during the capture duration and/or other information. The placement of the punchout within the visual content may be determined based on the position of the image capture device during the capture duration and/or other information.

The punchout of the visual content may include one or more spatial extents of the visual content to compensate for motion of the image capture device during the capture duration. The placement of the punchout may reduce, remove, and/or smooth the motion present in the video frames/visual content due to translational and/or rotational motion of the image capture device during the capture duration. For example, a punchout having a smaller size than the field of view of the video frames/visual content may be used to provide a punchout of the video frames/visual content. The punchout (cropped view) may be moved within the field of view of the video frames/visual content to provide a stabilized view of the video frames/visual content. Movement of the punchout within the field of view of the video frames/visual content may be effectuated via movement of the punchout itself and/or via movement of the video frames/visual content.

The punchout may be oriented with respect to the field of view of the video frames/visual content to provide a punchout of the video frames/visual content that is stable/smooth with respect to prior and/or next punchout of the video frames/visual content. For example, the punchout may be oriented with respect to the field of view of video frames captured by the image capture device to provide a punchout of the video frames such that the visual content within the viewing window appears to have been captured with a stable/more stable image capture device (e.g., a punchout of a video frame being stable/more stable with a punchout of the preceding video frame and/or a subsequent video frame).

In some implementations, the visual content may be stabilized by manipulation of the visual content. Manipulation of the visual content may include movement, warping, and/or other manipulation of the visual content. Stabilization of the visual content using manipulation of the visual content may include moving and/or warping the visual content so that the depictions included within the visual content appears more stable than unmanipulated visual content. The amount and/or the direction by which the visual content is manipulated (e.g., moved, warped) may be determined based on the motion of the image capture device during the capture duration (as indicated by the selected motion) and/or other information. For example, based on rotation of the image capture device during the capture duration, the visual content may be rotated so that the visual content appears to have been captured with a stable/more stable image capture device. Other stabilization of the visual content based on the selected motion of the image capture device is contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
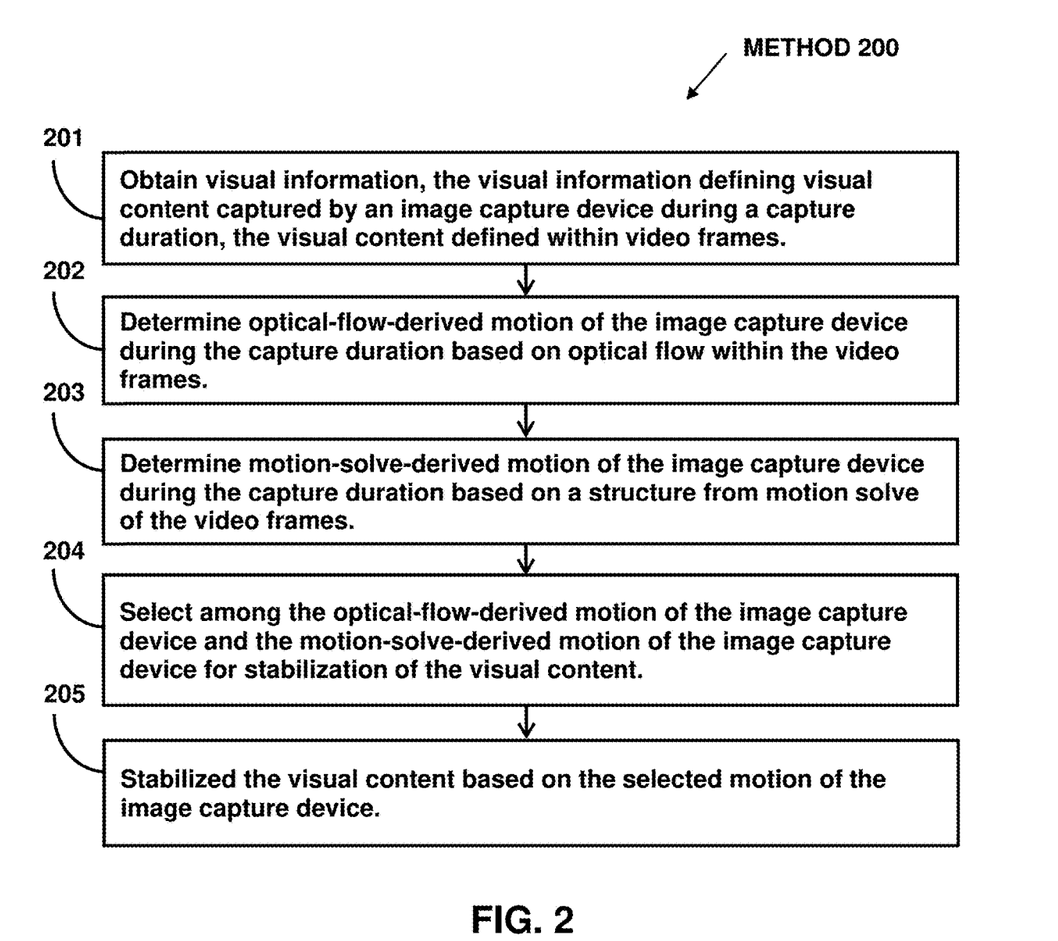
FIG. 2 illustrates an example method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information may be obtained. The visual information may define visual content captured by an image capture device during a capture duration. The visual content may be defined within video frames. In some implementation, operation 201 may be performed by a processor component the same as or similar to the visual information component 102 (Shown in FIG. 1 and described herein).

At operation 202, optical flow derived motion of the image capture device during the capture duration may be determined based on optical flow within the video frames and/or other information. In some implementation, operation 202 may be performed by a processor component the same as or similar to the optical flow component 104 (Shown in FIG. 1 and described herein).

At operation 203, motion solve derived motion of the image capture device during the capture duration may be determined based on a structure from motion solve of the video frames and/or other information. In some implementation, operation 203 may be performed by a processor component the same as or similar to the motion solve component 106 (Shown in FIG. 1 and described herein).

At operation 204, selection may be made among the optical flow derived motion of the image capture device and the motion solve derived motion of the image capture device for stabilization of the visual content. In some implementation, operation 204 may be performed by a processor component the same as or similar to the selection component 108 (Shown in FIG. 1 and described herein).

At operation 205, the visual content may be stabilized based on the selected motion of the image capture device and/or other information. In some implementation, operation 205 may be performed by a processor component the same as or similar to the stabilization component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for stabilizing videos, the system comprising:
one or more physical processors configured by machine-readable instructions to:
obtain visual information, the visual information defining visual content captured by an image capture device during a capture duration, the visual content defined within video frames;
determine optical flow derived motion of the image capture device during the capture duration based on optical flow within the video frames;
determine motion solve derived motion of the image capture device during the capture duration based on a structure from motion solve of the video frames;
select among the optical flow derived motion of the image capture device and the motion solve derived motion of the image capture device for stabilization of the visual content; and
stabilize the visual content based on the selected motion of the image capture device;
wherein:
selecting among the optical flow derived motion of the image capture device and the motion solve derived motion of the image capture device includes switching between the optical flow derived motion of the image capture device and the motion solve derived motion of the image capture device; and
switching between the optical flow derived motion of the image capture device and the motion solve derived motion of the image capture device includes:
initially selecting the motion solve derived motion of the image capture device for the stabilization of the visual content; and
switching from the motion solve derived motion of the image capture device to the optical flow derived motion of the image capture device for the stabilization of the visual content responsive to failure of the motion solve of the video frames.

2. The system of claim 1, wherein selecting among the optical flow derived motion of the image capture device and the motion solve derived motion of the image capture device is performed based on detection of a scene depicted within the visual content, detection of one or more things depicted within the visual content, and/or detection of optical illusion depicted within the visual content.

3. The system of claim 1, wherein different motion of the image capture device for the stabilization of the visual content are selected for different segments of the capture duration such that for a first segment of the capture duration, the optical flow derived motion of the image capture device is selected for the stabilization of the visual content, and for a second segment of the capture duration, the optical flow derived motion of the image capture device is selected for the stabilization of the visual content.

4. The system of claim 1, wherein one or more spatial extents of the visual content are masked to selectively use the selected motion of the image capture device to stabilize the visual content.

5. The system of claim 4, wherein the one or more spatial extents of the visual content are masked based on distances of one or more things depicted within the visual content from the image capture device during the capture duration.

6. The system of claim 4, wherein the one or more spatial extents of the visual content are masked based on detection of one or more things depicted within the visual content.

7. A system for stabilizes videos, the system comprising:
one or more physical processors configured by machine-readable instructions to:
obtain visual information, the visual information defining visual content captured by an image capture device during a capture duration, the visual content defined within video frames;
determine optical flow derived motion of the image capture device during the capture duration based on optical flow within the video frames;
determine motion solve derived motion of the image capture device during the capture duration based on a structure from motion solve of the video frames;
select among the optical flow derived motion of the image capture device and the motion solve derived motion of the image capture device for stabilization of the visual content; and
stabilize the visual content based on the selected motion of the image capture device;
wherein selecting among the optical flow derived motion of the image capture device and the motion solve derived motion of the image capture device includes options of:
selecting the optical flow derived motion of the image capture device for the stabilization of the visual content;
selecting the motion solve derived motion of the image capture device for the stabilization of the visual content; and
selecting both the optical flow derived motion of the image capture device and the motion solve derived motion of the image capture device for the stabilization of the visual content.

8. The system of claim 7, wherein the optical flow derived motion of the image capture device and the motion solve derived motion of the image capture device are weighed differently for the stabilization of the visual content.

9. The system of claim 7, wherein selecting among the optical flow derived motion of the image capture device and the motion solve derived motion of the image capture device is performed based on detection of a scene depicted within the visual content, detection of one or more things depicted within the visual content, and/or detection of optical illusion depicted within the visual content.

10. The system of claim 7, wherein different motion of the image capture device for the stabilization of the visual content are selected for different segments of the capture duration such that for a first segment of the capture duration, the optical flow derived motion of the image capture device is selected for the stabilization of the visual content, and for a second segment of the capture duration, the optical flow derived motion of the image capture device is selected for the stabilization of the visual content.

11. The system of claim 7, wherein one or more spatial extents of the visual content are masked to selectively use the selected motion of the image capture device to stabilize the visual content.

12. The system of claim 11, wherein the one or ore spatial extents of the visual content are masked based on distances of one or more things depicted within the visual content from the image capture device during the capture duration.

13. The system of claim 11, wherein the one or more spatial extents of the visual content are masked based on detection of one or more things depicted within the visual content.

14. A method for stabilizing videos, the method performed by a computing system including one or more processors, the method comprising:
obtaining, by the computing system, visual information, the visual information defining visual content captured by an image capture device during a capture duration, the visual content defined within video frames;
determining, by the computing system, optical flow derived motion of the image capture device during the capture duration based on optical flow within the video frames;
determining, by the computing system, motion solve derived motion of the image capture device during the capture duration based on a structure from motion solve of the video frames;
selecting, by the computing system, among the optical flow derived motion of the image capture device and the motion solve derived motion of the image capture device for stabilization of the visual content; and
stabilizing, by the computing system, the visual content based on the selected motion of the image capture device;
wherein:
selecting among the optical flow derived motion of the image capture device and the motion solve derived motion of the image capture device includes switching between the optical flow derived motion of the image capture device and the motion solve derived motion of the image capture device; and switching between the optical flow derived motion of the image capture device and the motion solve derived motion of the image capture device includes:
  initially selecting the motion solve derived motion of the image capture device for the stabilization of the visual content; and
  switching from the motion solve derived motion of the image capture device to the optical flow derived motion of the image capture device for the stabilization of the visual content responsive to failure of the motion solve of the video frames; or selecting among the optical flow derived motion of the image capture device and the motion solve derived motion of the image capture device includes options of:
  selecting the optical flow derived motion of the image capture device for the stabilization of the visual content;
  selecting the motion solve derived motion of the image capture device for the stabilization of the visual content; and
  selecting both the optical flow derived motion of the image capture device and the motion solve derived motion of the image capture device for the stabilization of the visual content.

15. The method of claim 14, wherein the optical flow derived motion of the image capture device and the motion solve derived motion of the image capture device are weighed differently for the stabilization of the visual content.

16. The method of claim 14, wherein selecting among the optical flow derived motion of the image capture device and the motion solve derived motion of the image capture device is performed based on detection of a scene depicted within the visual content, detection of one or more things depicted within the visual content, and/or detection of optical illusion depicted within the visual content.

17. The method of claim 14, wherein different motion of the image capture device for the stabilization of the visual content are selected for different segments of the capture duration such that for a first segment of the capture duration, the optical flow derived motion of the image capture device is selected for the stabilization of the visual content, and for a second segment of the capture duration, the optical flow derived motion of the image capture device is selected for the stabilization of the visual content.

18. The method of claim 14, wherein one or more spatial extents of the visual content are masked to selectively use the selected motion of the image capture device to stabilize the visual content.

19. The method of claim 18, wherein the one or more spatial extents of the visual content are masked based on distances of one or more things depicted within the visual content from the image capture device during the capture duration.

20. The method of claim 18, wherein the one or more spatial extents of the visual content are masked based on detection of one or more things depicted within the visual content.

* * * * *

UNITED STATES PATENT AND TRADEMARK OFFICE
CERTIFICATE OF CORRECTION

PATENT NO. : 11,611,702 B1
APPLICATION NO. : 17/028407
DATED : March 21, 2023
INVENTOR(S) : Robert McIntosh et al.

It is certified that error appears in the above-identified patent and that said Letters Patent is hereby corrected as shown below:

In the Claims

In Claim 12, Column 20, Line 33, please replace "ore" with --more--, therefor.

Signed and Sealed this
Second Day of May, 2023

*Katherine Kelly Vidal*

Katherine Kelly Vidal
*Director of the United States Patent and Trademark Office*